March 4, 1969     L. J. VAGEDES ET AL     3,430,818

FEED CONTROLS FOR MATERIAL UNLOADERS

Filed Jan. 30, 1968     Sheet _1_ of 2

INVENTORS.
LAWRENCE J. VAGEDES
JOHN H. BING
BY
Charles M. Hogan
Gary M. Dixon
ATTORNEYS.

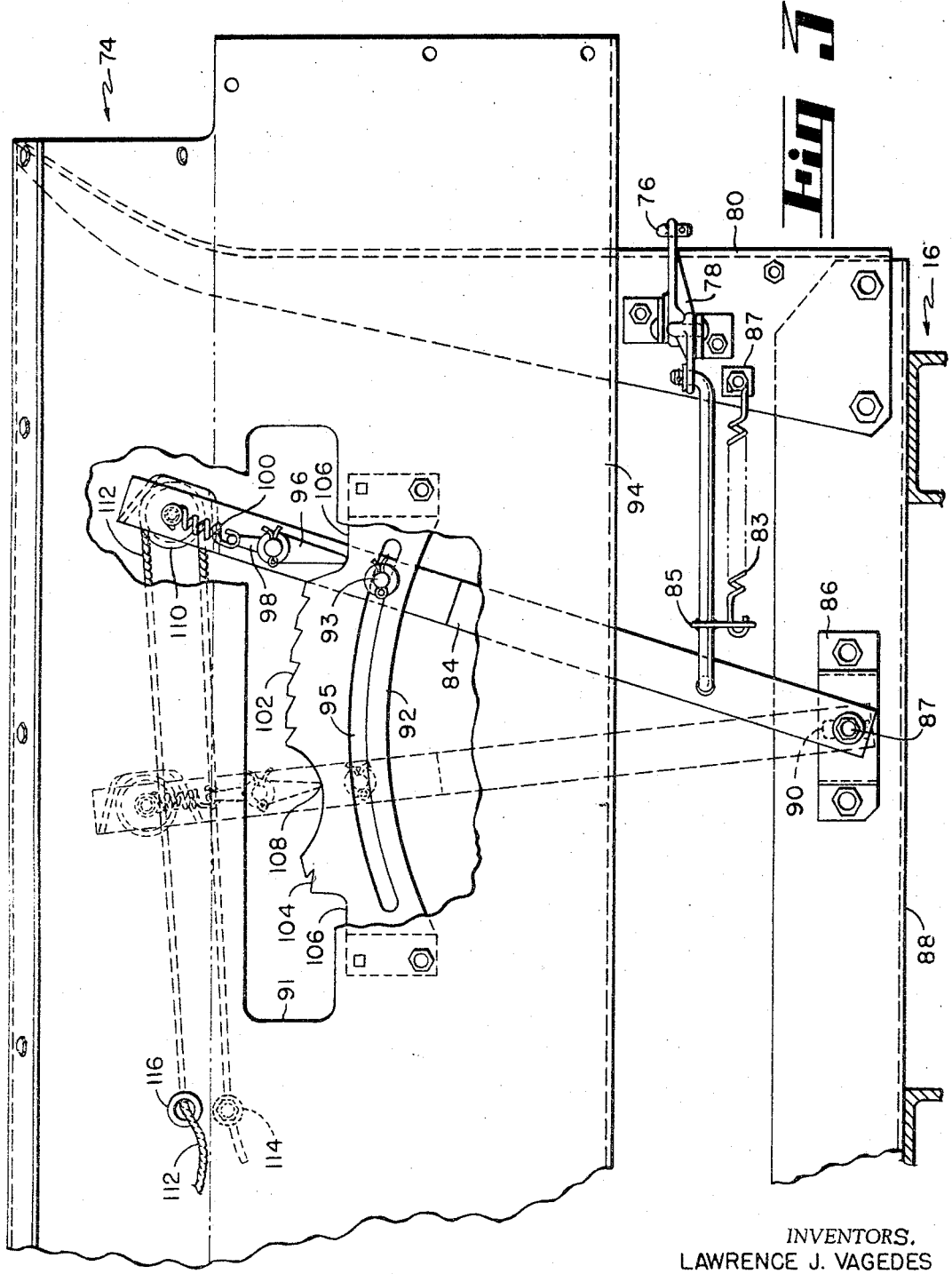

United States Patent Office 3,430,818
Patented Mar. 4, 1969

3,430,818
FEED CONTROLS FOR MATERIAL UNLOADERS
Lawrence J. Vagedes, Celina, and John H. Bing, Greenville, Ohio, assignors to Avco Corporation, Coldwater, Ohio, a corporation of Delaware
Filed Jan. 30, 1968, Ser. No. 701,666
U.S. Cl. 222—178        7 Claims
Int. Cl. B67d 5/64; G01f 11/20, 13/00

ABSTRACT OF THE DISCLOSURE

The disclosure illustrates an improved feed control system for a material unloader, including a conveyor which operates at selected rates to deliver material in the unloader to a distributing device for discharge. In response to linear displacement inputs, a single drive source operates the distributing device at a given rate and the conveyor at selected rates for normal operation. A displacement input beyond the normal operating positions causes the conveyor to be operated at the maximum rate and the distributing device to be disengaged for clean-out of material. A pivotal control arm is positioned to permit visual observation and actuated to provide the displacement inputs by a rope extending to a remote location. The control arm is maintained in predetermined positions corresponding to the selected rates of operation of the conveying mechanism by a pawl and ratchet plate. The ratchet plate is shaped to selectively permit a substantial displacement to the clean-out position or to one of the selected rates of operation.

---

The present invention relates to material unloading devices and more particularly devices of this type which are capable of operating at varying rates of operation.

Material unloading devices such as manure spreaders generally comprise a box or bed having a distributing unit at its aft end. A conveyor positioned in the floor of the bed moves the manure at a selected rate towards the distributing unit which then rips, shreds and spreads the manure in a uniform pattern. The conveyor and the distributing unit are powered from a single drive source, which in some instances is the power-take-off shaft of a tractor, used to pull the spreader. To achieve varying distribution rates for changing conditions, the distributing mechanism is operated at a given rate, but the conveyor is operated at one of a number of selected rates. When a load of manure has been distributed, a small residue remains in the bed of the spreader. To clean this out, the distributing unit is stopped and the conveyor operated at a high rate.

Present spreading units are arranged to permit the above operating conditions by means of a control system which receives linear displacement inputs. These linear displacement inputs in one direction provide an increasing rate of movement for the conveying device which increases the rate of movement of material to the distributing unit. A further displacement input causes the conveying mechanism to be operated at a high rate of operation and the distributing mechanism rendered inoperative. For simplification purposes the displacement input for these functions are provided by a single control element and this control element is maintained in given positions by a pawl and ratchet assembly.

However, pawl and ratchet assemblies commonly used on spreader controls have the disadvantage of requiring the unit to be placed in a clean-out position before the rate of distributing may be decreased to a lower level. This may at times necessitate shutdown in the field to manipulate the control arm to the proper position. Additionally, the clean-out position may be sufficiently close to the normal operating positions that inadvertent actuation of the clean-out position would be realized during normal operation.

Accordingly, it is a prime object of the present invention to provide a highly effective, simplified and positive control system for a spreader unit which has a high degree of flexibility.

The above ends are achieved by providing a control system for a material unloading device such as the types described above. The control system, in its broader aspects, comprises a displacement element connected to a drive means for the conveyor and the distributing unit to provide the displacement inputs. A ratchet is positioned adjacent the displacement element, the ratchet having a plurality of notches corresponding to the incremental displacement inputs and a notch substantially spaced from the plurality of notches for corresponding with the clean-out position. A pawl is pivotally mounted on the displacement element for engaging the notches on the ratchet. The plurality of notches in the clean-out notch, together with the pawl, cooperate to permit unidirectional movement of the displacement element towards an increasing rate of operation when the pawl is in one position and permit movement towards the decreasing rate of operation when the pawl is in a second position. The ratchet has a discontinuance between the plurality of notches and the clean-out notch for permitting the pawl to swing from one position to another whereby the displacement element may be selectively moved towards the decrease in rate of operation or towards an increasing rate of operation to engage the clean-out notch.

The above and other related objects and features of the present invention will be apparent from a reading of the description of the accompanying drawings and the novelty thereof pointed out in the appended claims.

In the drawings:

FIGURE 3 is a partially broken-away end view of the spreader shown in FIGURE 1, particularly showing a control system embodying the present invention.

Figure 1:
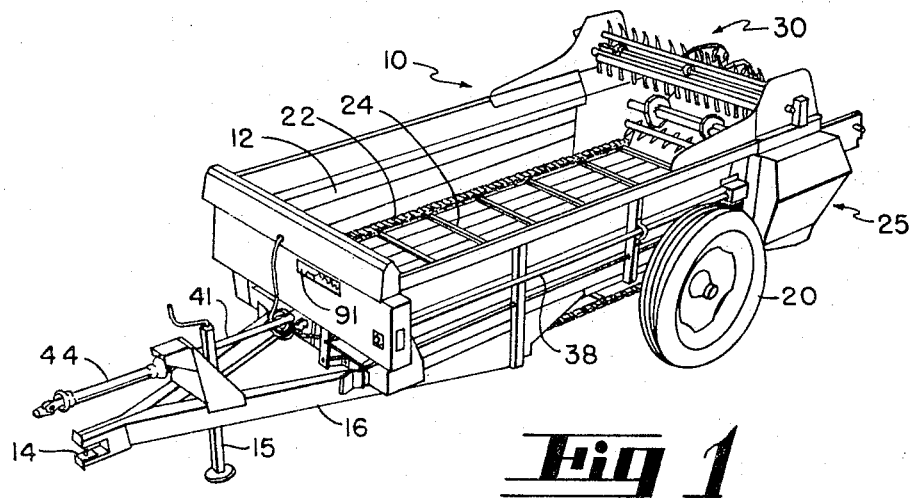
FIGURE 1 is a perspective view of a spreader unit incorporating a control system which embodies the present invention.

Reference is had to FIGURE 1 which shows a mobile material unloader 10. The material unloader 10 comprises an open-ended box 12 supported by wheels 20. A subframe 16 extends from the forward end of the box 12 for connection at a tongue 14 to the draw bar of a propulsion vehicle such as a tractor (not shown). A jack 15 supports the subframe 16 above the ground when the material unloader is not in use. The floor of the box 12 has a conveyor comprising a pair of continuous chains 22 and angle irons 24 extending therebetween. The chains are wrapped around idler sprockets (not shown) at the forward end of the box 12 and around drive sprockets (also not shown) at the aft end of the box 12. A drive unit 25, provided at the aft end of the box 12, rotates the drive sprockets in a direction which causes the angle iron 24 to move material placed in the box 12 towards its aft end.

A distributing unit 30 is placed at the aft end of the bed 12 to receive the material from the conveyor and distribute the material in a predetermined pattern. The distributing mechanism 30 may be any one of a number of types of distributing mechanisms which, through the action of rotating teeth and paddles, break up the material and cause it to be distributed in a relatively wide uniform pattern. The rotating components of the distributing unit 30 are also driven from the drive unit 25. The drive unit 25 may be ground-drive powered or, as herein shown, from a shaft 38 extending to the forward end of the box 12. A chain drive (not shown), shaft 41 and a universal shaft 44 connect the shaft 38 to a suitable drive source such as a power-take-off (PTO) shaft.

Figure 2:
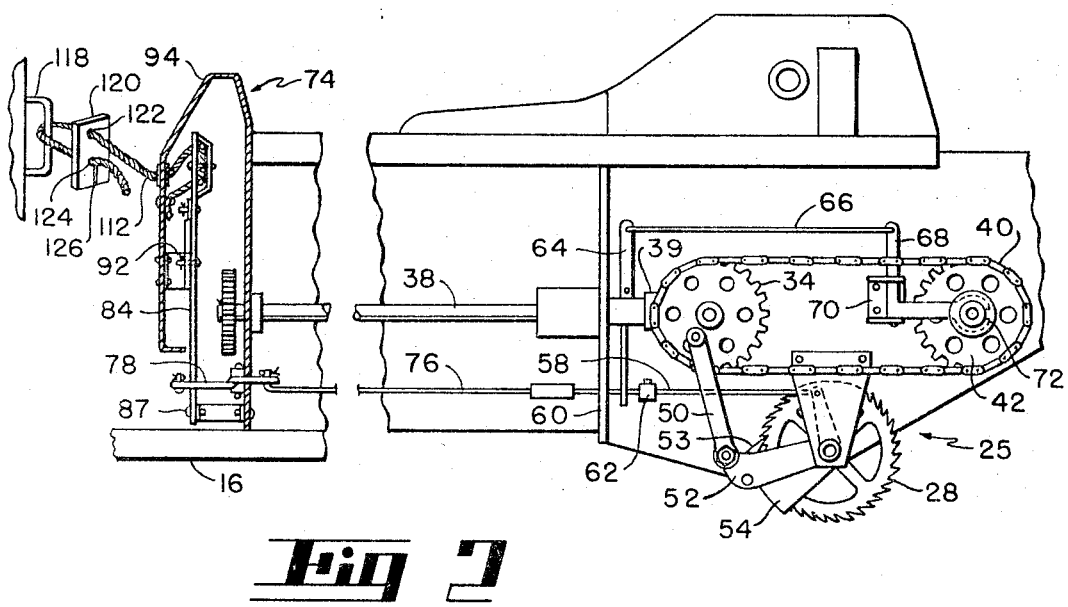
FIGURE 2 is a fragmentary side view of the spreader shown in FIGURE 1.

As shown in detail in FIGURE 2, the drive unit 25 comprises an input gear 34 connected to the shaft 38 through a gear box 39. A chain 40 connects the input gear 34 to a drive gear 42 for the rotating components of the distributing unit 30. An offset crank arm 50 is secured to the drive gear 34 and to arms 52 journaled on the axis of a conveyor drive gear 28 for the conveyor chains 22. A pawl 53 is pivotally mounted between the arms 52 and urged into the teeth on the conveyor drive gear 28 by a suitable spring (not shown). An arcuate housing 54 is journaled on the axis of the conveyor drive gear 28 and shaped to cover a portion of the teeth around its periphery. A lever arm 56 extends from the axis of the housing 54 to a control rod 58, guided for longitudinal movement by an opening in a flange 60 which extends from the bed 12 of the spreader.

A sleeve 62 is secured to the control rod 58 at such a position that extreme movement of the control rod 58 to the left causes the sleeve 62 to pivot a control arm 64, bolted to the walls of the drive unit 25. An actuating rod 66 is pivotally connected to the opposite end of the control arm 62 and extends to a bell crank assembly 68 journaled in a support element 70. The opposite end of the bell crank assembly 68 actuates a clutch assembly 72. The clutch assembly 72 may be one of a number of assemblies which normally couple the gear 42 to the rotating components of the distributing unit 30 and decouple the gear 42 when the control arm 64 is pivoted by the sleeve 62.

In normal operation, the clutch assembly 72 couples the output of the gear 42 to the rotating components of the distributing unit 30. These rotate at a rate set by the rotational speed of the shaft 38. As the input gear 34 rotates, the offset crank arm 50 is reciprocated, thus causing the arms 52 to swing through an arcuate reciprocal movement. As noted previously, the pawl 53 is urged towards the conveyor drive gear 28 to engage the teeth of the gear 28. When the pawl engages a tooth it carries that tooth along to the topmost portion of the pawl's cycle. This causes an intermittent movement from the conveyor drive gear 28. The housing 54 is pivoted about the axis of the gear 28 to cover a portion of the stroke of the pawl 53. In so doing, the housing 54 acts to vary the arcuate displacement of the wheel by the pawl 53 for a given stroke of the crank arm 50 and the arms 52. For example, if the housing 54 is pivoted to almost an extreme clockwise position to cover all but the final portion of the stroke of the pawl 53, a given cycle of the arm 52 produces a small arcuate displacement of the conveyor drive gear 28. Conversely, for movement of the control rod 58 to almost an extreme clockwise position, the housing 54 covers up a smaller amount of the stroke, thereby permitting the pawl 53 to produce a greater arcuate displacement of the conveyor drive gear 28 for a given cycle of the crank arm 50. It is apparent then that linear longitudinal movements of the control rod 58 may be used to effectively control the rate of intermittent movement of the conveyor drive gear 28 and consequently the overall rate of movement of material in the bed 12 towards the distributing unit 30. This in effect controls the distribution rate of the material from the spreader 10.

When substantially all of the material has been removed from the bed 12 it is frequently desirable to clean out any residue that may remain. For this purpose the control rod 58 is moved to an extreme counterclockwise position which permits the pawl 53 to produce a high intermittent rate of movement from the gear 28 and causes the sleeve 62 to engage the control arm 64 to decouple the gear 42 from the rotating components of the spreader 30. This enables the material in the bed of the spreader 10 to be rapidly removed without being thrown back into the bed by the rotatable components of the spreader 30.

Thus it can be seen that the rate of operation of the spreader is effectively controlled by longitudinal displacement of a single control rod. In accordance with the present invention the control rod 58 is actuated by an improved spreader control system, generally indicated by reference character 74 via a coupling rod 76 to produce the required longitudinal displacements which control the operation of the drive unit 25.

As shown particularly in FIGURE 3, the spreader control system 74 comprises a bell crank 78 pivotally secured to a vertical support post 80 for the bed 12. One arm of the bell crank 78 is connected to the coupling rod 76 and the other end is connected to a rod 82 which is connected to an intermediate portion of a displacement element 84. As herein illustrated, the displacement element 84 is pivotally mounted to a support plate 86 at 87. The support plate 86 is bolted to a cross support member 88 extending across the subframe 16. It should be noted that a slot 90 is formed in the support plate 86 to permit limited vertical displacement of the pivot point of the displacement element 84 relative to the cross support member 88, as later described in detail. The displacement element has a pawl 96 pivotally secured thereto. The pawl 96 has a rod 98 extending from its pivot point for connection with a spring 100 which is secured adjacent the outer end of the displacement element 84.

The radially outward portion of the element 84 traverses a ratchet plate 92 which is bolted to a sheet metal housing 94, extending from the upper forward portion of the bed 12 (see particularly FIGURE 2). A pin and washer assembly 93 extends from the displacement element 84 through an arcuate slot 95 formed in the ratchet plate 92 to maintain the displacement element 84 and the ratchet plate 92 adjacent one another.

A series of notches 102 formed in the ratchet plate 92 corresponds to longitudinal displacements of the control rod 58 (FIGURE 2) to provide normal operation of the spreader 10. As will be later discussed in detail, the notches 102 are placed in an arcuate fashion and are angled to the left. A notch 104 corresponding to the displacement of the control rod 58 which provides a clean-out of the spreader 10, is substantially spaced from the notches 102. Cut-away portions 106 are provided on the ratchet 92 adjacent the outer ends of the plurality of notches 102 and the clean-out notch 104 to permit free-swinging movement of the pawl 96. Additionally, a discontinuance 108 is provided in the ratchet 92 between the clean-out notch 104 and the notches 102 to also permit free-swinging movement of the pawl.

A pulley 110, over which a rope 112 extends, is journaled on the outer end of the displacement element 84. One end of the rope 112 is bolted to the housing 94 at 114. The opposite end of the rope 112 extends through a suitable bushing 116 in the housing 94 and to a suitable mount or bracket 118 in a remote location, such as a tractor (FIGURE 2). The remote end of the rope 112 is secured to the bracket 118 by a rubber pad 120. The pad 120 has an opening 122 through which the rope 112 extends before being wrapped around the bracket 118. A second opening 124 having a slot 126 formed to the outer edge of the pad 120 receives the end of the rope 112.

The displacement element 84 is urged towards a clockwise position against the action of the rope 112 by a spring 83, which is connected to a bracket 85 on the rod 82 and a bracket 87 on the post 80. The spring 83 is herein illustrated as being connected directly to the control system linkage. However, it is possible to position the spring adjacent the control rod 58 and still provide a spring bias for the element 84.

The spreader control system provides the displacement inputs to the control rod 58 in the following fashion. Assuming the displacement element 84 is in the illustrated extreme clockwise position, the control rod 58 is in a neutral position which prevents any intermittent movement of the covneyor drive gear 28. By pulling on the remote end of the rope 112, the displacement element 84 is pulled in a counterclockwise direction, thus pulling the pawl 96 over the notches 102 and pivoting the pawl 96 to a position which permits movement only in a counterclockwise direction because of the position of notches 102. The displacement element 84 may then be moved in a counterclockwise direction until it is positioned over a selected notch. The rope tension is then released which allows the spring to hold the pawl in the notch. The rope may be again pulled to increase the rate of operation or to displace the element 84 to the discontinuance 108 in the ratchet plate 92. At this point the pawl 96 is permitted to swing to an intermediate position from which the displacement element 84 may be allowed to displace in a clockwise direction by the action of the spring 83. In this direction the pawl 96 is pivoted towards the counterclockwise direction, thus permitting the pawl 96 to pass over the notches 102 to the most clockwise position. As an alternative, the arm 84 may be displaced in a counterclockwise direction from the position over the discontinuance 108 to engage the clean-out notch 104. Once the clean-out function is finished the element 84 may be pivoted further in the counterclockwise direction to permit the pawl 96 to swing to the neutral position, which would permit movement by the action of the spring 83 to the extreme clockwise position when rope tension is released.

By providing an option to move the displacement element 84 to the clean-out notch 104 or to one of the normal operating notches, a great deal of flexibility for the control system is realized, thus obviating the necessity of shutdown of the unit in the field when it is necessary to go from a higher normal operating position to a lower one. It should be noted that since the clean-out notch 104 is substantially spaced from the normal operating notches 102, the possibility of inadvertent placement of the lever 84 into the clean-out notch is substantially minimized. Furthermore, the pulley and rope assembly used to displace the outer end of the displacement arm 84 provides a mechanical advantage which requires a movement at the remote end of the rope 112 of approximately twice the amount of movement for the far end of the displacement arm 84. This effectively enables a further spacing of the clean-out notch from the normal operating notches 102.

The window 91 provided in the housing permits visual observation of the displacement element 84 to determine its position relative to the notches for the particular operating conditions selected. Thus, the displacement element 84 functions as both an indexing mechanism and as a means for visually indicating the operating condition of the drive unit 25.

It was previously pointed out that the mounting plate to which the displacement element 84 is pivotally mounted is connected to the cross member 88 through the slot 90 which permits limited vertical movement. This is done because extremely heavy loads of material in the bed 12 deflect the forward end of the bed 12 to which the housing 94 is secured relative to the subframe 16 to which the cross member 88 is secured. By providing the slot 90 and slidably pinning the displacement element 84 to the ratchet plate 92, the pivot axis of the element 84 is maintained at a given distance relative to the notches 102, 104 on the ratchet plate 92 irrespective of the displacement of the housing 94 relative to the cross member 88.

The rope 112 which is used to actuate the control system from the remote location is provided with a breakaway connection in the form of the rubber pad 120. It should be noted that the slot 126 in the rubber pad enables the end of the rope 112 to be pulled away from the bracket 118 in the case where the spreader 10 is disconnected from the tractor or other drive unit while the rope 112 control is not.

Having thus described the invention, what is claimed as novel and desired to be secured by Letters Patent of the United States is:

1. In a material unloading device having means for distributing material from said device, means positioned in said device for conveying material to said distributing means and drive means engageable with said distributing means and said conveying means, said drive means being adapted to actuate said distributing means at a given rate and said conveying means at increasing incremental rates of operation in response to incremental displacement inputs in a given direction, said drive means being further adapted to actuate said conveying means at a maximum rate and disengage said discharge means for clean-out of material from said device in response to a displacement input in said given direction to a clean-out position, a control system for said drive means, said control system comprising:

a displacement element connected to said drive means for providing said displacement inputs;

a ratchet positioned adjacent said displacement element, said ratched having a plurality of notches corresponding to said incremental displacement inputs and a notch substantially spaced from the plurality of notches for corresponding with said clean-out position;

a pawl pivotally mounted on said displacement element for engaging the notches on said ratchet;

said pawl being pivotable between a first position in the direction of increasing rate of operation and a second position in the direction of a decreasing rate of operation;

said plurality of notches and said clean-out notch being positioned to only permit unidirectional movement of said displacement element towards an increasing rate of operation when said pawl is in said second position and to permit movement towards a decreasing rate of operation when said pawl is in said first position;

said ratchet having a discontinuance between said plurality of notches and said clean-out notch for permitting said pawl to swing to said first position whereby said displacement element may be selectively moved towards a decrease in rate of operation and towards an increasing rate of operation to engage said clean-out notch.

2. Apparatus as in claim 1 wherein said control system is adapted to be actuated from a remote location and said apparatus further comprises:

means for yieldably urging said displacement element towards the position corresponding to a low rate of operation;

rope means connected at one end to said displacement element and extending to said remote location, said rope means being positioned to substantially directly oppose said yieldable urging means when the remote end of said rope means is placed in tension.

3. Apparatus as in claim 2 wherein:

said material unloading device is releasably engageable with an operator-controlled propulsion device, whereby said operator-controlled device is the remote location from which said control system is actuated;

means for releasably securing the remote end of said rope means to said propulsion device comprising:

an elastomeric pad having a first opening for mounting to said rope means adjacent its remote end and a second opening through which the end of said rope means is looped;

said elastomeric pad having a slot extending from the second opening to the outer edge of said pad whereby the end of said rope is pulled away from said slot when the tension on said rope is above a given level.

4. Apparatus as in claim 2 wherein:

said displacement element is pivotally mounted about an axis and said pawl is pivotally mounted on said displacement element substantially radially spaced from said pivot axis, the notches in said ratchet being arcuately positioned for providing uniform engaging with said pawl;

said apparatus further comprises a pulley rotatably mounted to said displacement element radially outward from said pawl;

said rope means is passed around said pulley and has one end thereof substantially fixed relative to the pivotal axis of said displacement element so that a given movement of the opposite end of said rope produces substantially one half the displacement by the axis of said pulley;

whereby said mechanism requires substantial movements to effect a change in the rate of operation of said drive means.

5. Apparatus as in claim 2 further comprising:

means mounted on said displacement element for yieldably holding said pawl in a position intermediate said first and second positions, whereby said selective movement of said displacement element may be achieved irrespective of the position of said control system relative to a horizontal plane.

6. Apparatus as in claim 3 wherein:

said material unloading device comprises a subframe and a bed mounted on said subframe, said bed being of such a construction that the forward end thereof deflects relative to said subframe when said device is loaded with relatively heavy material;

said ratchet is mounted on the forward end of said bed and has an arcuate slot having a center of curvature generally coincident with the pivot axis of said displacement element;

said displacement element further comprises a pin secured thereto and extending through said arcuate slot for guiding said displacement element relative to said slot;

the pivot axis of said displacement element is mounted on said subframe for permitting movement of said pivot axis relative to said subframe during deflection of said bed relative to said subframe;

whereby the angular displacement of said displacement element is relatively unaffected by deflection of said bed.

7. Apparatus as in claim 1 wherein said apparatus further comprises:

means for actuating said displacement element from a remote location;

a housing surrounding said control system and having an opening adjacent said displacement element and said ratchet for permitting visual observation thereof from said remote location;

said displacement element and said ratchet being positioned in a plane substantially normal to said remote location whereby the position of said displacement element provides an indication of the rate of operation of said drive means.

References Cited

UNITED STATES PATENTS

| 1,204,620 | 11/1916 | Vulgamott | 222—177 |
| 2,925,203 | 2/1960 | Whittemore | 222—227 |
| 3,015,416 | 1/1962 | Peoples et al. | 222—311 |
| 3,351,243 | 11/1967 | Kennedy et al. | 222—178 |
| 3,366,281 | 1/1968 | Wilder | 222—178 |

WALTER SOBIN, *Primary Examiner.*

U.S. Cl. X.R.

222—227, 238, 280, 287, 41.5